United States Patent
Jojima et al.

(10) Patent No.: US 10,677,348 B2
(45) Date of Patent: Jun. 9, 2020

(54) ELECTRIC VEHICLE AND CONTROL METHOD FOR ELECTRIC VEHICLE

(71) Applicant: TOYOTA JIDOSHA KABUSHIKI KAISHA, Toyota-shi, Aichi-ken (JP)

(72) Inventors: Yuki Jojima, Nagoya (JP); Hitoshi Imura, Chiryu (JP); Tomoo Yamabuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 16/185,649

(22) Filed: Nov. 9, 2018

(65) Prior Publication Data
US 2019/0195352 A1 Jun. 27, 2019

(30) Foreign Application Priority Data
Dec. 21, 2017 (JP) .................. 2017-245352

(51) Int. Cl.
F16H 61/02 (2006.01)
B60L 15/20 (2006.01)
F16H 59/14 (2006.01)
F16H 59/36 (2006.01)

(52) U.S. Cl.
CPC ...... *F16H 61/0213* (2013.01); *B60L 15/2054* (2013.01); *B60L 2210/40* (2013.01); *B60L 2240/421* (2013.01); *B60L 2240/423* (2013.01); *B60L 2240/48* (2013.01); *B60L 2240/486* (2013.01); *B60L 2240/526* (2013.01); *F16H 59/14* (2013.01); *F16H 59/36* (2013.01); *F16H 2059/147* (2013.01); *F16H 2059/366* (2013.01)

(58) Field of Classification Search
None
See application file for complete search history.

(56) References Cited

U.S. PATENT DOCUMENTS

| | | | |
|---|---|---|---|
| 2015/0015168 A1 | 1/2015 | Terao | |
| 2015/0280565 A1* | 10/2015 | Okamura | B60L 50/16 307/10.1 |
| 2015/0372632 A1* | 12/2015 | Kato | B60L 1/00 318/722 |
| 2015/0375747 A1* | 12/2015 | Shishido | B60W 10/04 701/48 |

FOREIGN PATENT DOCUMENTS

| | | |
|---|---|---|
| JP | 2012-175769 A | 9/2012 |
| JP | 2015-016830 A | 1/2015 |
| JP | 2016-005368 A | 1/2016 |

* cited by examiner

*Primary Examiner* — Justin Holmes
(74) *Attorney, Agent, or Firm* — Oliff PLC

(57) ABSTRACT

An electric vehicle includes: a motor for traveling; a transmission connected to the motor; a battery; an inverter configured to convert direct-current power output by the battery, into alternating-current power for driving the motor; a capacitor connected between a positive electrode of direct-current input terminals of the inverter and a negative electrode of the direct-current input terminals of the inverter; and a controller configured to change a gear stage of the transmission when both of a condition i) and a condition ii) are satisfied. The condition i) is a condition that the rotation speed of the motor is in a predetermined range. The condition ii) is a condition that the output of the motor exceeds a predetermined output threshold.

3 Claims, 3 Drawing Sheets

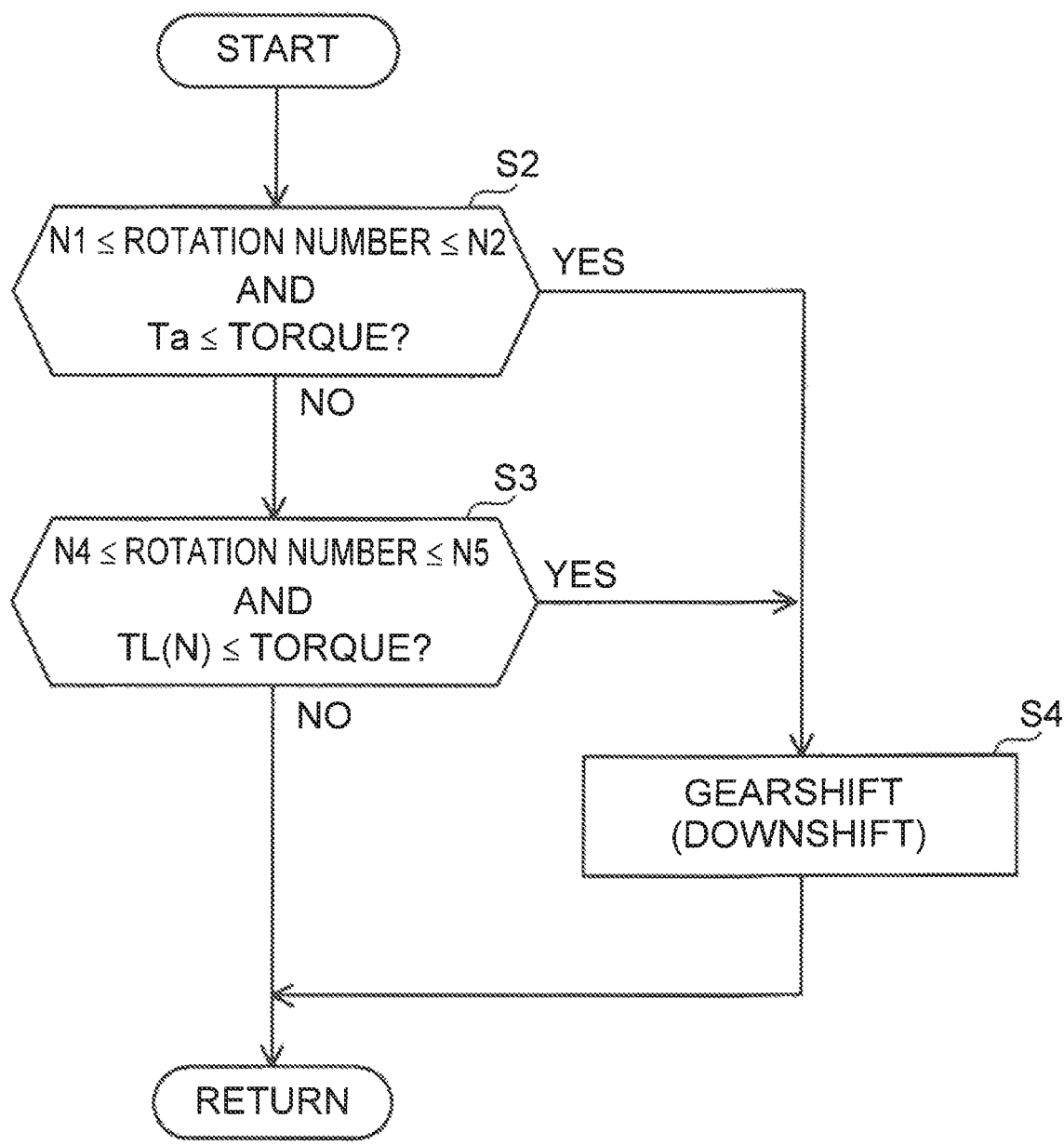

ELECTRIC VEHICLE AND CONTROL METHOD FOR ELECTRIC VEHICLE

INCORPORATION BY REFERENCE

The disclosure of Japanese Patent Application No. 2017-245352 filed on Dec. 21, 2017 including the specification, drawings and abstract is incorporated herein by reference in its entirety.

BACKGROUND

1. Technical Field

A technology disclosed in the present specification relates to an electric vehicle including a motor for traveling and a transmission and having a capacitor connected between a positive electrode and a negative electrode of an inverter that supplies alternating-current power to the motor, and a control method for the electric vehicle. The "electric vehicle" in the present specification includes a hybrid vehicle equipped with both of a motor and an engine, and a fuel cell vehicle.

2. Description of Related Art

An electric vehicle includes an inverter that converts electric power from a direct-current power source, into alternating-current power appropriate to drive of a motor for traveling. In some cases, a smoothing capacitor is connected between a positive electrode and a negative electrode of direct-current input terminals of the inverter. It is known that LC resonance easily occurs when the rotation speed of the motor is in a particular range in the case where the capacitor is connected between the direct-current power source and the inverter (for example, Japanese Patent Application Publication No. 2016-5368 (JP 2016-5368 A) and Japanese Patent Application Publication No. 2012-175769 (JP 2012-175769 A)). The LC resonance increases current ripple, and increases loss. Here, inductance causing the LC resonance can be parasitic inductance of a power transmission path between the power source and the inverter, or can be inductance of a reactor included in a boost converter in the case where the boost converter is connected between the power source and the inverter.

JP 2016-5368 A discloses a technology of suppressing the LC resonance by changing a pulse pattern for driving the inverter. An electric vehicle disclosed in JP 2012-175769 A includes a motor for traveling and a transmission. In the technology disclosed in JP 2012-175769 A, the gear stage of the transmission is decided such that the rotation speed of the motor does not fall within a rotation number zone in which the LC resonance is induced.

SUMMARY

In the technology disclosed in JP 2012-175769 A, a particular rotation number zone of the motor cannot be used at all. Therefore, the technology is inefficient. The technology of avoiding the LC resonance by adjusting the gear stage has room for improvement.

A first aspect of the disclosure is an electric vehicle. The electric vehicle includes: a motor for traveling; a transmission connected to the motor; a battery; an inverter configured to convert direct-current power output by the battery, into alternating-current power for driving the motor; a capacitor connected between a positive electrode of direct-current input terminals of the inverter and a negative electrode of the direct-current input terminals of the inverter; and a controller configured to change a gear stage of the transmission when both of a condition i) and a condition ii) are satisfied. The condition i) is a condition that the rotation speed of the motor is in a predetermined range. The condition ii) is a condition that the output of the motor exceeds a predetermined output threshold. When the output of the motor is low, a gearshift for avoiding LC resonance is not performed, and thereby, it is possible to effectively use the motor.

In the electric vehicle, the controller may be configured to execute a downshift control of shifting down the gear stage of the transmission, when both of the condition i) and the condition ii) are satisfied.

A second aspect of the disclosure is a control method for an electric vehicle. The electric vehicle includes: a motor for traveling; a transmission connected to the motor; a battery; an inverter configured to convert direct-current power output by the battery, into alternating-current power for driving the motor, a capacitor connected between a positive electrode of direct-current input terminals of the inverter and a negative electrode of the direct-current input terminals of the inverter; and a controller. The control method includes changing a gear stage of the transmission with the controller, when both of a condition i) and a condition ii) are satisfied. The condition i) is a condition that the rotation speed of the motor is in a predetermined range. The condition ii) is a condition that the output of the motor exceeds a predetermined output threshold. When the output of the motor is low, a gearshift for avoiding LC resonance is not performed, and thereby, it is possible to effectively use the motor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a flowchart of a gearshift for avoiding resonance.

DETAILED DESCRIPTION OF EMBODIMENTS

Figure 1:
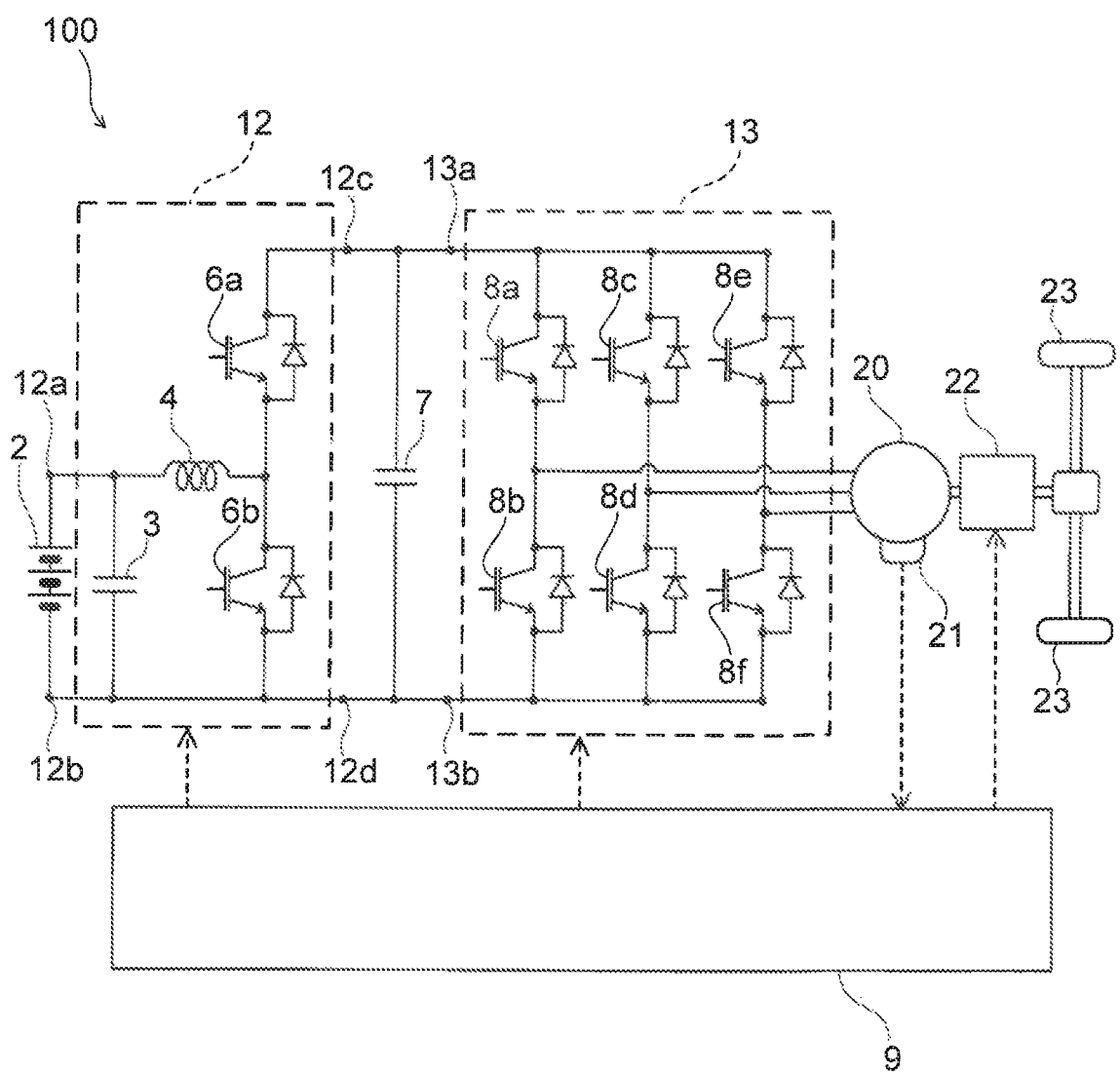
FIG. 1 is a block diagram of an electric power system of an electric vehicle in an embodiment.

An electric vehicle 100 in an embodiment will be described with reference to the drawings. FIG. 1 shows a block diagram of an electric power system of the electric vehicle 100. The electric vehicle 100 in the embodiment travels by means of a motor 20. The motor 20 is a three-phase alternating-current motor. In addition to the motor 20 for traveling, the electric vehicle 100 includes a battery 2, a DC converter 12, an inverter 13, a smoothing capacitor 7, a transmission 22, and a controller 9.

The battery 2 is a lithium-ion battery, for example, and the output voltage of the battery 2 is 200 volts, for example. The drive power of the motor 20 is 200 volts to 600 volts, for example. The drive power of the motor 20 is sometimes higher than the output power of the battery 2, and therefore, the electric vehicle 100 includes a DC converter 12. The DC converter 12 has both a step-up function to step up a voltage applied to low-voltage terminals 12a, 12b and then output the voltage to high-voltage terminals 12c, 12d and a step-down function to step down a voltage applied to the high-voltage terminals 12c, 12d and then output the voltage to the low-voltage terminals 12a, 12b. That is, the DC converter 12 is a bidirectional DC-DC converter.

The DC converter 12 includes a filter capacitor 3, a reactor 4, power transistors 6a, 6b, and two diodes. The diodes are connected to the power transistors 6a, 6b in inverse parallel, respectively. The two power transistors 6a, 6b are connected in series between the high-voltage terminals 12c, 12d. One end of the reactor 4 is connected to the positive electrode 12a of the low-voltage terminals. The other end of the reactor 4 is connected to a middle point between the two power transistors 6a, 6b connected in series. The filter capacitor 3 is connected between the positive electrode 12a and negative electrode 12b of the low-voltage terminals. The negative electrode 12b of the low-voltage terminals and the negative electrode 12d of the high-voltage terminals are directly connected to each other.

The power transistor 6a on the positive electrode side is related to a step-down operation, and the power transistor 6b on the negative electrode side is related to a step-up operation. When complementary drive signals are supplied to the power transistor 6a on the positive electrode side and the power transistor 6b on the negative electrode side, switching between the step-up operation and the step-down operation is passively performed depending on the balance between a voltage applied to the low-voltage terminals 12a, 12b and a voltage applied to the high-voltage terminals 12c, 12d. This function is suitable for an electric vehicle in which the motor 20 generates electricity when a driver presses a brake pedal. That is, the motor 20 outputs torque when the driver presses an accelerator pedal, and generates regenerative electric power when the driver presses the brake pedal. The DC converter 12 needs to perform the switching between the step-up function and the step-down function depending on driver's random pedal work. Since the switching between the step-up operation and the step-down operation is passively performed, the DC converter 12 has an advantage in that a switching control depending on driver's pedal work is unnecessary. The regenerative electric power is used for charge of the battery 2.

Direct-current input terminals 13a, 13b of the inverter 13 are connected to the high-voltage terminals 12c, 12d of the DC converter 12. The inverter 13 includes six power transistors 8a-8f and six diodes. The six power transistors 8a-8f include three pairs of power transistors connected in series. The three pairs of power transistors connected in series are connected in parallel between the positive electrode 13a and negative electrode 13b of the direct-current input terminals. The six diodes are connected to the six power transistors 8a-8f in inverse parallel, respectively. From respective middle points of the three pairs of power transistors connected in series, alternating currents are output. From the middle points of the three pairs of power transistors connected in series, three-phase alternating currents are output.

The smoothing capacitor 7 is connected in parallel between the DC converter 12 and the inverter 13. In other words, the smoothing capacitor 7 is connected between the positive electrode 13a and negative electrode 13b of the direct-current input terminals of the inverter 13. The smoothing capacitor 7 is provided in order to suppress pulsation of electric current that flows between the DC converter 12 and the inverter 13.

The power transistors 6a, 6b of the DC converter 12 and the power transistors 8a-8f of the inverter 13 are controlled by the controller 9. The controller 9 decides a target output of the motor 20, based on the current rotation number of the motor 20, the current accelerator operation amount and the like. The target output of the motor 20 is converted into a target voltage of the DC converter 12 and a target frequency of the inverter 13. The controller 9 drives the power transistors 6a, 6b of the DC converter 12 such that the target voltage is realized, and drives the power transistors 8a-8f of the inverter 13 such that the target frequency is realized. A rotation number sensor 21 is attached to the motor 20, and the rotation speed of the motor 20 measured by the rotation number sensor 21 is sent to the controller 9. In FIG. 1, dashed arrows express signal lines. The controller 9 performs a feedback control of the motor 20 (the inverter 13), based on measured data of the rotation number sensor 21 and measured data of an unillustrated current sensor to measure electric current that is supplied to the motor 20.

In FIG. 1, the controller 9 is expressed as a single rectangle. The controller 9 may realize the function in cooperation with a storage device in which programs are stored and a plurality of central processing units.

An output shaft of the motor 20 is connected to the transmission 22. An output shaft of the transmission 22 is connected to driving wheels 23 through an axle and a differential gear. The transmission 22 may be a stepped transmission, or may be a continuously variable transmission (CVT). The transmission 22 is also controlled by the controller 9.

As shown in FIG. 1, the battery 2, the filter capacitor 3, the reactor 4 and the smoothing capacitor 7 are constantly connected. The filter capacitor 3, the smoothing capacitor 7 and the reactor 4 constitutes an LC circuit, and LC resonance occurs in some cases. The LC resonance increases ripple current that is generated by the power transistors 6a, 6b, 8a-8f, and increases electric power loss. Therefore, it is desirable to suppress the LC resonance. In the controller 9, an algorism for suppressing the LC resonance is implemented. A process for suppressing the LC resonance will be described below.

For driving the inverter 13, the controller 9 uses a PWM control and a rectangular wave control while performing switching between the PWM control and the rectangular wave control. In the PWM control, it is necessary to generate a carrier wave. The controller 9 uses one of some carrier frequencies depending on a predetermined condition. Since the PWM control and rectangular wave control for inverters are well known, detailed descriptions are omitted.

Figure 2:
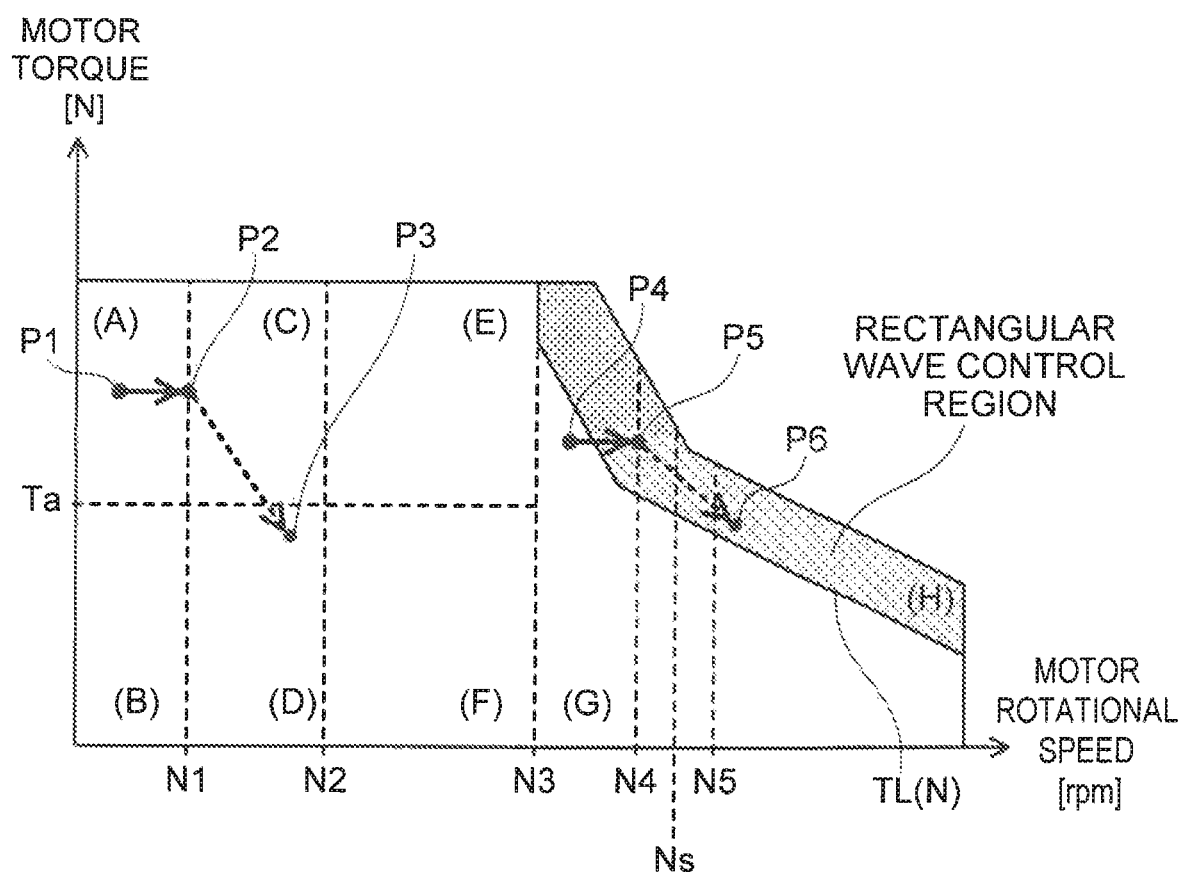
FIG. 2 is a TN diagram of a motor.

FIG. 2 shows a TN diagram of the motor 20. The TN diagram is a graph in which the abscissa axis indicates the rotation speed of the motor 20 and the ordinate axis indicates the output torque of the motor 20. The TN diagram shows the condition of the switching between the PWM control and the rectangular wave control and the condition of the switching of the carrier frequencies.

The controller 9 executes the PWM control in a region where the rotation speed of the motor 20 is lower than a rotation number N3. The controller 9 performs the switching to the rectangular wave control in a region (a region (H) in FIG. 2) where the rotation number is higher than the rotation number N3 and where the output torque is high. To facilitate understanding, the region (H) where the rectangular wave control is executed is painted in gray.

The region where the PWM control is executed is divided into seven regions depending on the rotation number and the output torque, and a different carrier frequency is used for each region. In a region (A) where the rotation number is lower than a rotation number N1 and where the output torque is higher than a torque Ta, the carrier frequency is set to a frequency fa. In a region (B) where the rotation number is lower than the rotation number N1 and where the output torque is lower than the torque Ta, the carrier frequency is set to a frequency fb. In a region (C) where the rotation number is between the rotation number N1 and a rotation number N2 and where the output torque is higher than the torque Ta, the carrier frequency is set to a frequency fc. In a region (D) where the rotation number is between the rotation number N and the rotation number N2 and where the output torque is lower than the torque Ta, the carrier frequency is set to a frequency fd. In a region (E) where the rotation number is between the rotation number N2 and the rotation number N3 and where the output torque is higher than the torque Ta, the carrier frequency is set to a frequency fe. In a region (F) where the rotation number is between the rotation number N2 and the rotation number N3 and where the output torque is lower than the torque Ta, the carrier frequency is set to a frequency ff. In a region (G) where the rotation number is higher than the rotation number N3 and where the output torque is lower than a torque TL(N), the carrier frequency is set to a frequency fg. The "torque TL(N)" shows that the output torque of the motor 20 is expressed as a function in which the output torque of the motor 20 changes depending on the rotation number N of the motor 20. A solid line TL(N) in FIG. 2 shows a dependence relation of the output torque on the rotation number. The carrier wave is not used in the region (H) where the rectangular wave control is executed.

The LC resonance occurs when the resonance frequency of the LC circuit in FIG. 1 (or an integral multiple of the resonance frequency) is close to any one of ripple frequencies of the power transistors 6a, 6b, 8a-8f. In the present specification, the "resonance frequency" means "the resonance frequency or an integral multiple of the resonance frequency".

In the PWM control, the ripple frequency is equal to the carrier frequency, and in the rectangular wave control, the ripple frequency is equal to the rotational frequency of the motor 20. Hence, when a carrier frequency close to the LC resonance frequency is almost selected, the controller 9 performs a gearshift of the transmission 22, and changes the rotation number and output torque of the motor 20, to a region where a different carrier frequency is used.

FIG. 3 shows a flowchart of a gearshift process that is executed by the controller 9 for avoiding the LC resonance. In the embodiment, it is assumed that a carrier frequency close to the LC resonance frequency is assigned to the region (C) in the TN diagram of FIG. 2 and carrier frequencies greatly different from the resonance frequency are assigned to the other regions (A), (B), (D)-(G). The region (C) is a region where the rotation speed of the motor 20 is between the rotation number N1 and the rotation number N2 and where the output torque is higher than Ta.

Further, it is assumed that a rotation number between the rotation number N4 and the rotation number N5 is a rotation number close to the resonance frequency in the region (H) that is the rectangular wave control region. Actually, a rotation number Ns between the rotation number N4 and the rotation number N5 coincides with the resonance frequency, and the LC resonance significantly occurs in a zone containing the rotation number Ns (a zone between the rotation number N4 and the rotation number N5).

The controller 9 periodically executes the process of FIG. 3. The controller 9 acquires the current rotation number and current output torque of the motor 20, and determines whether a first condition is satisfied (step S2). The first condition is a condition that the current rotation number of the motor 20 is in a range from the rotation number N1 to the rotation number N2 and the current output torque is equal to or higher than Ta. When the first condition is satisfied, the LC resonance occurs. Hence, when the first condition is satisfied, the controller 9 sends a gearshift command to the transmission 22 (step S2: YES, S4). Specifically, the controller 9 commands downshift to the transmission 22. That is, the controller 9 shifts down the gear stage by one. By the downshift, the gear ratio of the transmission 22 increases. Then, for matching with the vehicle speed and output torque before the gearshift, the rotation speed of the motor 20 increases, and the output torque decreases.

Hereinafter, the rotation number and output torque of the motor 20 during traveling are referred to as drive state of the motor 20. In the TN diagram of FIG. 2, the drive state of the motor 20 is expressed as a point. For example, suppose that the motor speed (vehicle speed) as the drive state gradually increases from a point P1 in FIG. 2. The drive state moves from the point P1 to a point P2 in FIG. 2. The point P2 is on the boundary between the region (A) and the region (C). When the drive state enters the region (C), the determination of YES is made in step S2 of FIG. 3, so that the controller 9 commands the downshift to the transmission 22. By the downshift of the transmission 22, in the motor 20, the rotation number rapidly increases, and the output torque rapidly decreases, so that the drive state instantly moves from the point P2 to a point P3. The point P3 is in the region (D). In the region (D), the LC resonance does not occur because the carrier frequency fd is greatly different from the LC resonance frequency. That is, the LC resonance is avoided.

The controller 9 acquires the current rotation number and current output torque of the motor 20, and determines whether a second condition is satisfied (step S3). The second condition is a condition that the current rotation number of the motor 20 is in a range from the rotation number N4 to the rotation number N5 in the region (H) where the rectangular wave control is executed. The rectangular wave control is executed in the case where the rotation number is higher than the rotation number N3 and where the output torque of the motor 20 is equal to or higher than the torque TL(N). Accordingly, the second condition can be expressed as a condition that the current rotation number of the motor 20 is in a range from the rotation number N4 to the rotation number N5 and the current output torque is equal to or higher than the torque TL(N). As described above, the torque TL(N) expresses a relation in which the output torque TL changes depending on the rotation number N of the motor 20. When the second condition is satisfied, the controller 9 sends the gearshift command to the transmission 22 (step S3: YES, S4). Specifically, the controller 9 commands the downshift to the transmission 22. That is, the controller 9 shifts down the gear stage by one. By the downshift, the gear ratio of the transmission 22 increases. Then, for matching with the vehicle speed and output torque before the gearshift, the rotation speed of the motor 20 increases, and the output torque decreases.

For example, suppose that the motor speed (vehicle speed) as the drive state of the motor 20 gradually increases from a point P4 in FIG. 2. When the drive state enters the region (H) for the rectangular wave control, the controller 9 switches the control for the inverter 13 from the PWM control to the rectangular wave control. When the rotation speed of the motor 20 further increases, the drive state moves to a point P5 in FIG. 2. The point P5 is on a boundary at which the second condition is satisfied. When the rotation number exceeds N4, the determination of YES is made in step S3 of FIG. 3, so that the controller 9 commands the downshift to the transmission 22. By the downshift of the transmission 22, in the motor 20, the rotation number rapidly increases, and the output torque rapidly decreases, so that the drive state instantly moves from the point P5 to a point P6. The point P6 is beyond a rotation number region where the LC resonance occurs (a region from the rotation number N4 to the rotation number N5). Accordingly, the LC resonance does not occur. That is, the LC resonance is avoided.

When the determination of NO is made in each of steps S2 and S3, the LC resonance is unlikely to occur. Therefore, the process of FIG. 3 ends without the gearshift for avoiding the resonance. The process of FIG. 3 is periodically executed, and thereby, the LC resonance is avoided.

The electric vehicle 100 in the embodiment performs the gearshift when the rotation speed of the motor 20 is in a predetermined range and the output of the motor 20 is higher than a predetermined output threshold. The case where the rotation speed of the motor 20 is in a predetermined range and where the output of the motor 20 is higher than a predetermined output threshold is a case where any one of the ripple frequencies of the power transistors 6a, 6b, 8a-8f is close to the resonance frequency of the LC circuit. The controller 9 avoids the LC resonance, by controlling the transmission (gear stage) such that the ripple frequencies are not close to the resonance frequency of the LC circuit. In the case where the output torque is lower than a predetermined torque threshold (the torque Ta or torque TL(N) in the embodiment), the gearshift for avoiding the LC resonance is not performed because the LC resonance is unlikely to occur.

Notes about the technology described in the embodiment will be described. The controller 9 may store a plurality of TN maps similar to the TN map (the TN diagram showing the range in which the LC resonance can occur) shown in FIG. 2, and may switch the TN map depending on a condition. For example, the controller 9 may switch the TN map depending on the temperature of the DC converter 12 or the inverter 13. Alternatively, the controller 9 may perform switching among a plurality of TN maps that gives different drivabilities such as a sport mode and an ecology mode, depending on driver's switch operation. In each TN map, a unique range in which the LC resonance can occur is specified. In each TN map, the range in which the LC resonance can occur is specified by the rotation number and output torque of the motor 20. The controller 9 stores the TN maps in a mathematical formula format or a data array format.

In the embodiment, the command to the transmission for avoiding the LC resonance is the downshift command. The command to the transmission for avoiding the LC resonance may be an upshift command.

The rotation speed of the motor and the vehicle speed have an unambiguous relation, with the gear ratio. Accordingly, note that "the rotation speed of the motor" in the present specification may be replaced by "the vehicle speed". Each of the torque Ta and the torque TL(N) in the embodiment corresponds to an example of the output threshold. The output torque of the motor and the supplied electric current (supplied electric power) to the motor have also an unambiguous relation. Therefore, note that "the output torque" in the embodiment may be replaced by "the electric current to be supplied to the motor" or "the electric power to be supplied to the motor".

The gearshift control in FIG. 3 is a control scheme for avoiding the LC resonance. Separately from the gearshift control in FIG. 3, the controller 9 executes a gearshift control for increasing the drivability.

The technology disclosed in the present specification can be applied also to a hybrid vehicle including both of a motor and an engine for traveling and a fuel cell vehicle including a fuel cell as a power source.

Specific examples of the disclosure have been described above in detail. They are just examples, and do not limit the scope of the claims. The technology described in the scope of the claims includes various modifications and alterations of the above-described specific examples. Technical elements described in the present specification or drawings exert technical usefulness, independently or with various combinations. The invention is not limited to the combinations described in the claims at the time of the application. Further, the technology described in the present specification or drawings can concurrently achieve a plurality of purposes, and has technical usefulness simply by achieving one of the purposes.

What is claimed is:

1. An electric vehicle comprising:
   a motor for traveling;
   a transmission connected to the motor;
   a battery;
   an inverter configured to convert direct-current power output by the battery, into alternating-current power for driving the motor;
   a capacitor connected between a positive electrode of direct-current input terminals of the inverter and a negative electrode of the direct-current input terminals of the inverter; and
   a controller configured to change a gear stage of the transmission when both of a condition i) and a condition ii) are satisfied,
   i) a rotation speed of the motor being in a predetermined range, and
   ii) an output of the motor exceeding a predetermined output threshold.

2. The electric vehicle according to claim 1, wherein the controller is configured to execute a downshift control of shifting down the gear stage of the transmission when both of the condition i) and the condition ii) are satisfied.

3. A control method for an electric vehicle,
   the electric vehicle including: a motor for traveling; a transmission connected to the motor; a battery; an inverter configured to convert direct-current power output by the battery, into alternating-current power for driving the motor; a capacitor connected between a positive electrode of direct-current input terminals of the inverter and a negative electrode of the direct-current input terminals of the inverter; and a controller,
   the control method comprising
   changing, by the controller, a gear stage of the transmission, when both of a condition i) and a condition ii) are satisfied,
   i) a rotation speed of the motor being in a predetermined range, and
   ii) an output of the motor exceeding a predetermined output threshold.

* * * * *